United States Patent
Giles et al.

Patent Number: 6,104,492
Date of Patent: Aug. 15, 2000

[54] OPTICAL SIGNAL MONITOR FOR MULTIWAVE OPTICAL SIGNALS

[75] Inventors: Randy Clinton Giles, Whippany Township, Morris County; Lawrence Warren Stulz, Neptune Township, Monmouth County; James Albert Walker, Howell Township, Monmouth County, all of N.J.

[73] Assignee: Lucent Technologies Inc, Muray Hill, N.J.

[21] Appl. No.: 09/255,009

[22] Filed: Feb. 22, 1999

[51] Int. Cl.$^7$ ....................................................... G01B 9/02
[52] U.S. Cl. ............................................. 356/346; 356/352
[58] Field of Search ........................................ 356/346, 352

[56] References Cited

U.S. PATENT DOCUMENTS

5,982,488  11/1999  Shirasaki ............................ 356/352

*Primary Examiner*—Robert H. Kim
*Assistant Examiner*—Andrew H. Lee

[57] ABSTRACT

In accordance with the present invention, apparatus for and method of operating an optical signal monitor is disclosed for providing rapid monitoring of optical signals using a high speed optical modulator. One illustrative optical signal monitor includes (1) a Mechanical AntiReflective Switch (MARS) optical modulator (signal chopper) capable of operating at 10 MHz rates and having a detection bandwidth greater than 100 kHz and (2) a synchronous detector using lock-in detection in a 1550 nm-band WDM optical monitor to enhance detection sensitivity by greater than 30 dB compared to direction detection methods. According to another embodiment, the optical monitor can be used to control adaptive optical amplifier units or equalizer units of a wavelength division multiplexed (WDM) system.

14 Claims, 7 Drawing Sheets

OPTICAL SIGNAL MONITOR FOR MULTIWAVE OPTICAL SIGNALS

TECHNICAL FIELD OF THE INVENTION

This invention relates to optical signal monitors for multiwave optical signals and, more particularly, to apparatus for and method of operating an optical signal monitor using a high speed optical modulator.

BACKGROUND OF THE INVENTION

In optical communications systems, it is very critical to maintain optical signal levels at their correct power settings. In particular in wavelength division systems (WDMs), many impairments can cause some channels to have power levels that are too high or low. In long distance WDM systems in which optical signals generate nonlinear effects such as self-phase or cross-phase modulation, it is desirable to ensure that the power levels in each single span of the system remains well-equalized. The optical power levels are monitored by optical instruments such as optical spectrum monitors (or analyzers) and optical power meters.

Lock-in signal detection is commonly used to improve the sensitivity of these optical spectrum monitors and optical power meters. The method used is to chop the incoming optical signal and synchronously detect the electrical signal after the optical receiver. This enables a large reduction of electronic noise interference from the receiver, particularly in the presence of 1/F noise or drift in dc-coupled amplifiers. Conventional optical choppers comprised of either slotted rotating discs or resonant vanes are limited to chopping rates of about 10 KHz and limit the detection bandwidth to about 1000 Hz.

Many of the optical signal impairments that arise in a WDM system have fast transients, e.g., those caused by WDM add/drop or other protection switching operations. Consequently, there appears to be a strong need for an optical signal monitor having an increased detection speed and bandwidth.

SUMMARY OF THE INVENTION

In accordance with the present invention, apparatus for and method of operating an optical signal monitor is disclosed for providing rapid monitoring of optical signals using a high speed optical modulator. One illustrative optical signal monitor includes (1) a Mechanical AntiReflective Switch (MARS) optical modulator (signal chopper) capable of operating at 10 MHz rates having a detection bandwidth greater than 100 kHz and (2) a synchronous detector using lock-in detection in a 1550 nm-band WDM optical monitor to enhance detection sensitivity by greater than 30 dB compared to direction detection methods. In one embodiment, the MARS device is used at a high chopping rate, e.g., 1.02 MHz, which enables rapid-scanning; allowing less than 100 $\mu$sec filter time constants for high-rate data acquisition.

More particularly, in accordance with our invention, an optical monitor comprises (1) a temperature tuned silicon-etalon narrow band filter for scanning wavelength bands of an input multiwave optical signal selected in response to a temperature control signal; (2) an optical signal modulator, having at least a microsecond operating rate, for modulating the input multiwave optical signal at a rate determined by a received high frequency electrical signal; (3) a synchronous detector for detecting the modulated multiwave optical signal in synchronism with the high frequency electrical signal and for generating in response thereto the amplitude of the input multiwave optical signal; and (4) a controller for generating the temperature control signal for selecting the wavelength band being scanned by the silicon-etalon filter and responsive to the amplitude of the input multiwave optical signal for determining the amplitude of the input multiwave optical signal as a function of the scanned wavelength band.

According to another embodiment, an optical spectrum monitor comprises (1) an optical signal modulator, having at least a microsecond operating rate, for modulating an input multiwave optical signal at a rate determined by a received high frequency electrical signal and for outputting the modulated multiwave optical signal; (2) a lens for collimating the modulated multiwave optical signal; (3) a transversaly chirped etalon filter for receiving the collimated modulated multiwave optical signal; (4) a detector array, each detector receiving and detecting a narrow wavelength band signal portion of the collimated modulated multiwave optical signal to form therefrom an electrical signal; and (5) a controller for generating the high frequency electrical signal, for synchronously detecting each of the electrical signals, and for generating for each narrow wavelength band, data representing the amplitude of each narrow wavelength band signal portion of the input multiwave optical signal.

According to another embodiment, a wavelength division multiplexed (WDM) system includes our optical monitor to control one or more adaptive optical amplifier units and/or equalizer units of the system.

BRIEF DESCRIPTION OF THE DRAWING

In the drawings.

In the following description, identical element designations in different figures represent identical elements. Additionally, in the element designations the first digit refers to the figure in which that element is first located (e.g., 102 is located in FIG. 1).

DETAILED DESCRIPTION

Figure 1:
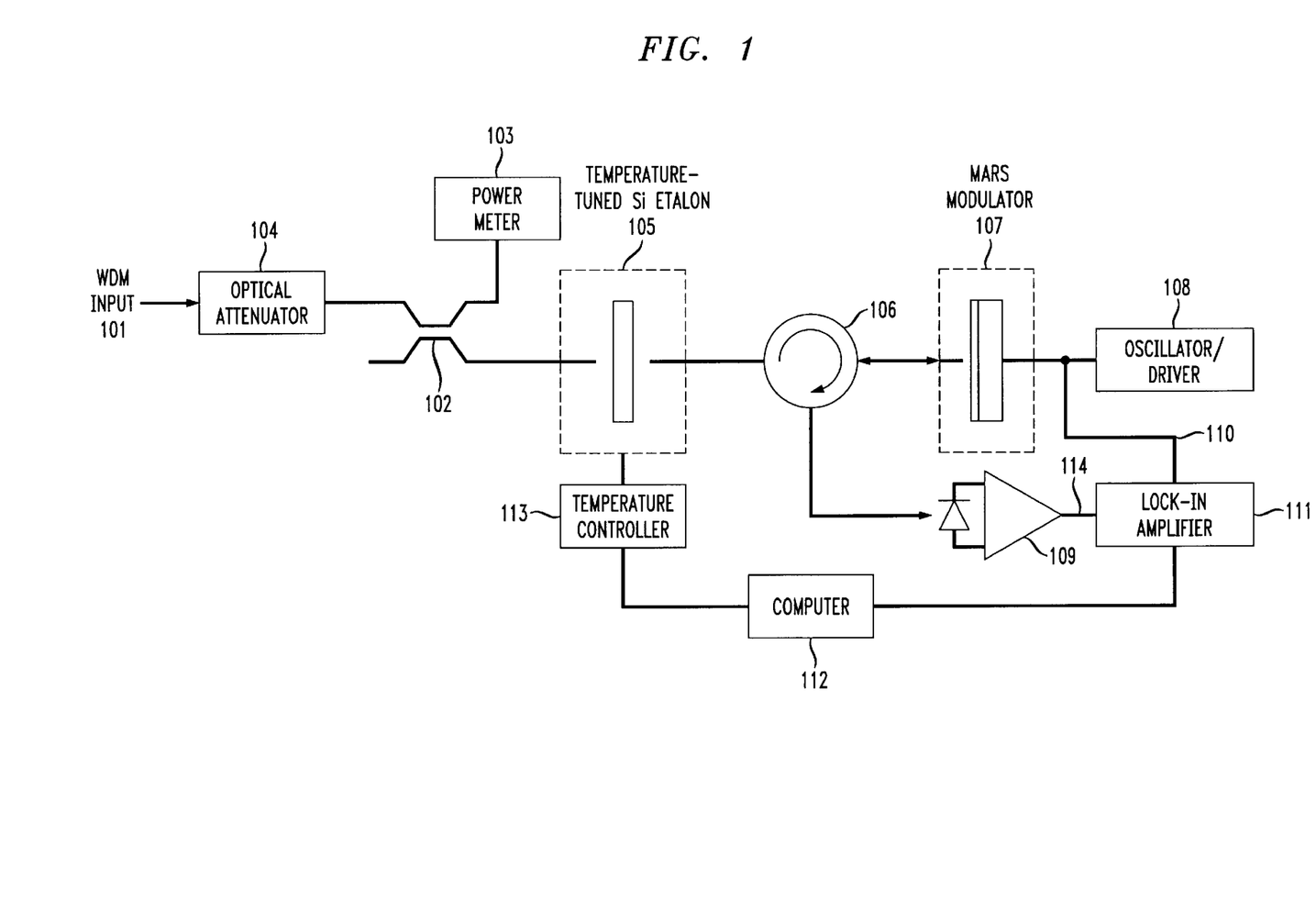
FIG. 1 shows an illustrative block diagram of a optical signal monitor in accordance with the present invention.

FIG. 1 shows an illustrative block diagram of a optical signal monitor (also referred to herein as an optical analyzer) in accordance with the present invention. A wavelength division multiplexed (WDM) (or optical multiwave) signal is received over facility 101. A coupler 101 taps a portion (e.g., 10 percent) of the input signal for use by the power meter 103 to determine the power level of the input WDM optical signal. The optical attenuator 104 is used to adjust the signal level to our monitor. A temperature tuned silicon-etalon filter 105 is a narrow band filter used to scan across the input WDM optical signal band. The temperature controller 113 controls the change in temperature of the silicon-etalon filter 105 and hence its scan rate. The output of silicon-etalon filter 105 is the input WDM signal wavelengths that exist in the narrow band being scanned by the silicon-etalon filter 105. The scanned input signal then passes through circulator 106 to the Mechanical AntiReflective Switch (MARS) signal chopper 107 (or optical modulator) which chops the signal at a high frequency rate (illustratively at 1.02 MHz), as determined by the oscillator/driver 108. The reflected chopped optical signal from the MARS unit 107 passes through the circulator 106 and exits to optical signal receiver 109. The receiver 109 may, illustratively, include a dc-coupled InGaAs PIN detector and transimpedance amplifier. The detected output signal 114 from receiver 109 is the envelope of the optical signal which has been chopped at the oscillator signal rate 110 and is the amplitude of the different wavelength channel signals of the input WDM signal 101. The detected output signal 114 along with the electrical oscillator/driver signal 110 are inputted to a lock-in amplifier 111. The oscillator signal 110 serves as a reference signal against which the phase of the detected output signal is compared. The lock-in amplifier 111 uses the oscillator/driver signal 110 to synchronously detect (or lock-in) the detected output signal 114. The lock-in amplifier 111, illustratively, includes an RF amplifier, a multiplier, and a low-pass filter. Thus, the receiver 109 together with the lock-in amplifier 111 form a synchronous detector to detect the reflected chopped optical signal in synchronism with the oscillator signal 110. The detected output of lock-in amplifier 111 is fed to a computer (or signal processor) 112 and is processed to determine a measured signal amplitude of each narrow band of wavelengths (band size determined by the silicon-etalon filter 105) as that narrow band is scanned across the input WDM signal 101 band. Since the computer 112 also controls the temperature controller 113, it produces output data which correlates the measured signal amplitude to the wavelength band being scanned. The high chopping rate of the MARS modulator (or chopper) 107 relative to conventional mechanical choppers enables high-speed data acquisition by computer 112 in real-time monitoring of complex optical signals and encourages the use of new and more effective techniques.

Illustratively, the MARS modulator device 107 is a low-order Fabry-Perot etalon consisting of an electrostatically-actuated, partially-reflective silicon membrane suspended over a silicon substrate [1]. (Note, in this specification, the number in brackets refers to the corresponding reference listed in the Appendix.) The device 107 in this example, has 1550 nm operation, has an actuation voltage from the reflective to nonreflective state of about 50V, about 2 MHz electrical bandwidth, and greater than 13 dB extinction ratio. Insertion loss during 1.02 MHz squarewave modulation is about 4.5 dB.

FIG. 1 shows an illustrative embodiment with the MARS device 107 connected, via circulator 106, to the temperature-tuned silicon-etalon filter 105. Although an optical circulator 106 is shown in FIG. 1, it should be noted that by using a MARS modulator 107 fabricated as 2-port variable attenuators [2], the need for the circulator (or optical coupler) 106. Such an connection is shown, illustratively, in FIG. 6 where MARS modulator 602 is shown to have a different input signal path and output signal path 602A.

Figure 2:
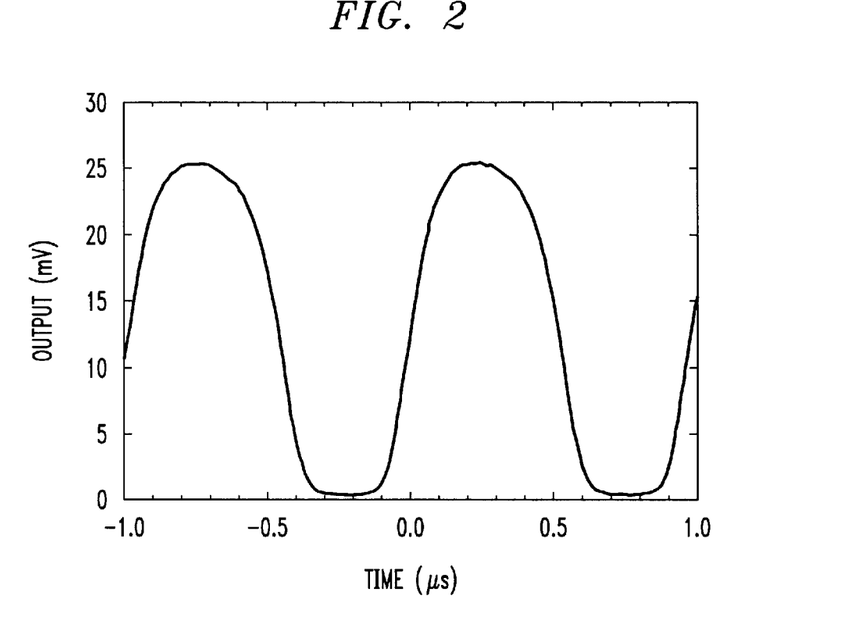
FIG. 2 shows, illustratively, the modulated signal output from a MARS chopper operating at a 1.02 MHz rate.

FIG. 2 shows, illustratively, the output of the MARS optical modulator 107 with a carrier wave (cw) input signal at 1552 nm serving as the input 101. As shown, the spacing between the peaks occur at the "chopping" rate of the 1.02 MHz signal from oscillator 108.

Figure 3:
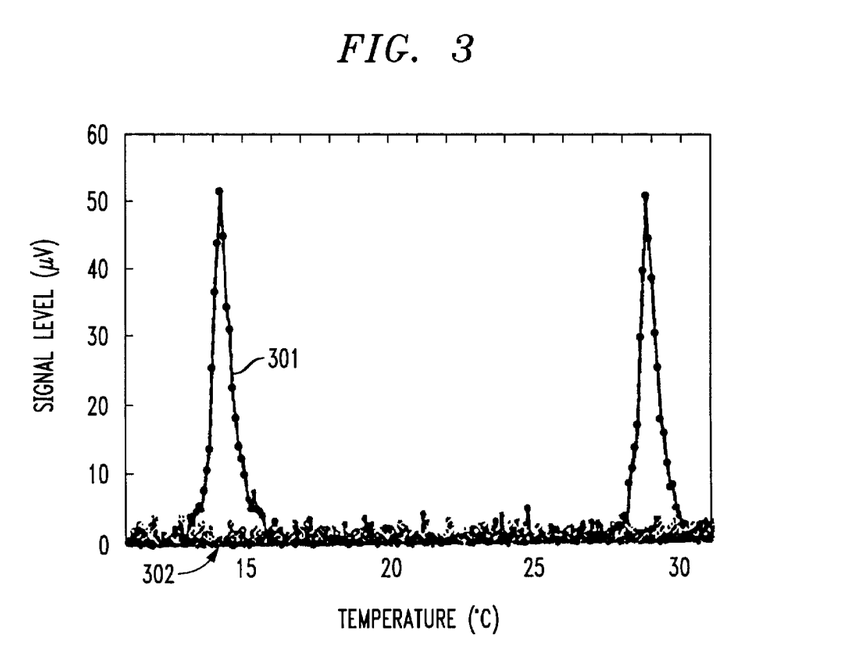
FIG. 3 shows an example of an output from the optical signal monitor.

The silicon-etalon filter 105, is designed for optical monitoring of WDM channels in the input signal 101 and, illustratively, has a "bandwidth" or free spectral range FSR=148 GHz, a finesse F=40 and fiber-to-fiber insertion loss $L_{etalon}$=12.0 dB. The silicon-etalon filter 105 may be the type the described in reference [3]. Illustratively, the silicon-etalon 105 FSR is scanned (over the FSR of 148 GHz) with a temperature excursion of 13.5° C. (FIG. 3) at a scanning rate of 0.1° C./sec. FIG. 3 shows an example of the output 301 from the FIG. 1 optical monitor (i.e., computer 112) using lock-in detection with a −51 dBm input signal 101 and 10 ms integration time. Baseline scans 302 without input signal are also shown.

The slow scanning rate (e.g., 0.1° C./sec) is not an inherent limitation to the detection bandwidth, which can be greater than 10 kHz. Total insertion loss from the input of the silicon-etalon filter 105 to the input of dc-coupled InGaAs PIN transimpedance receiver 109 (specified sensitivity −53 dBm for 10 Mb/s input digital optical signal) is about 19 dB. The receiver 109 output connects to lock-in amplifier unit 111 where it is further amplified with a 20 dB-gain ac-coupled RF amplifier and then detected with a lock-in amplifier.

Figure 4A:
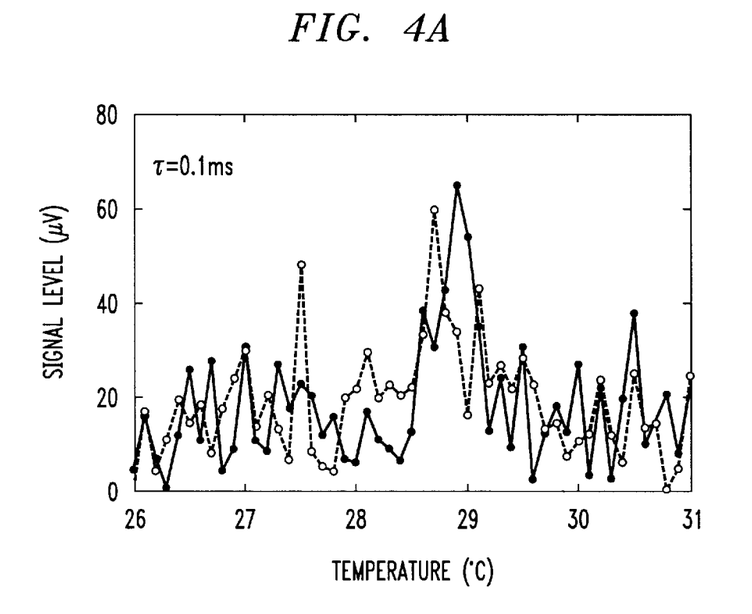
FIGS. 4A–4D shows a comparison of optical monitor output signal after lock-in detection of a signal over a variety of integration time constants from 100 $\mu$sec to 100 msec.
Figure 4B:
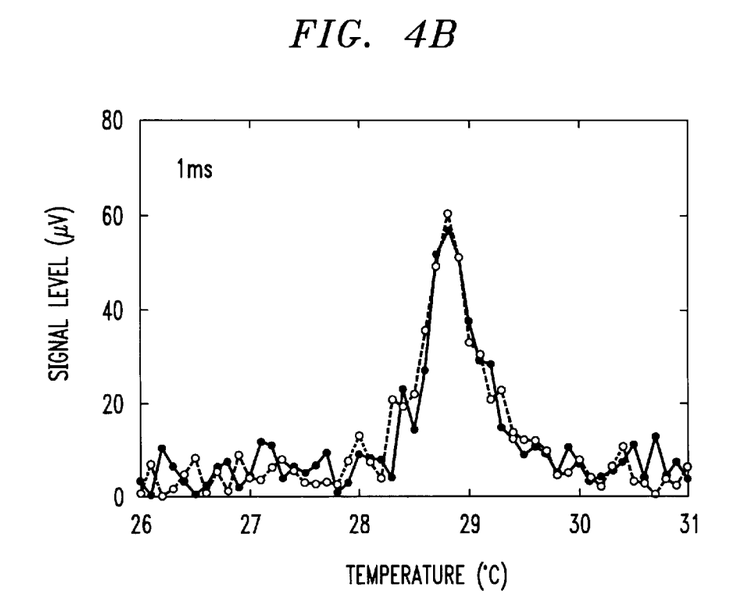
Figure 4C:
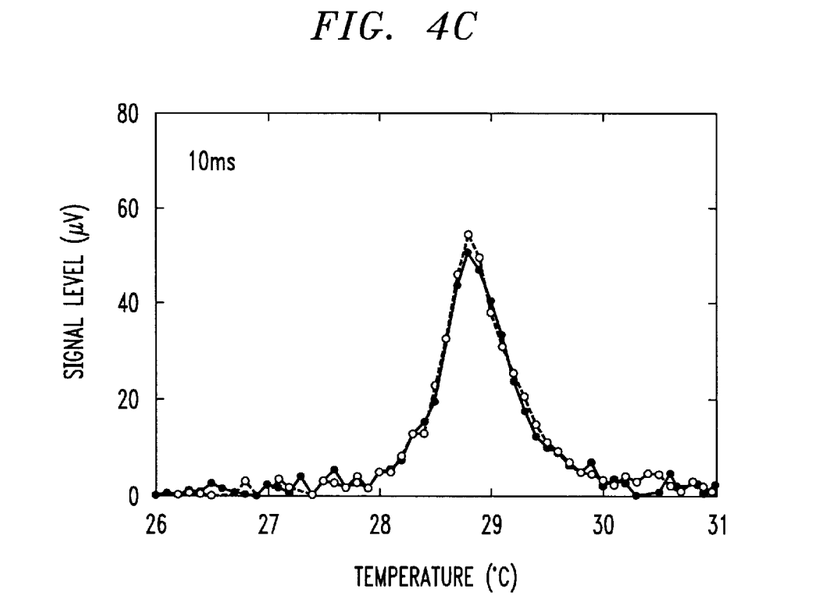
Figure 4D:
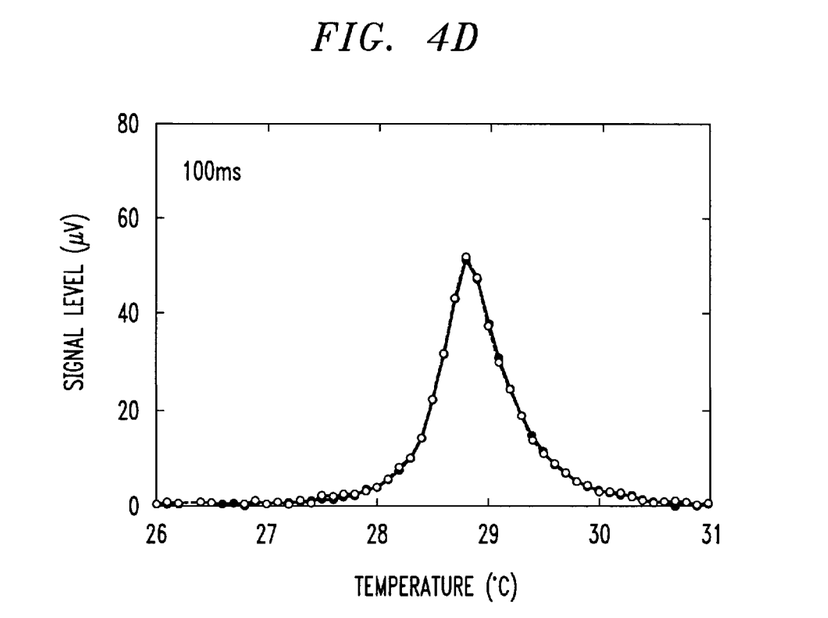

FIGS. 4A–4D show the optical monitor signal (the output of computer 112) with a 1552 nm input signal 101 detected with lock-in filter time constants of τ=100 μsec to 100 msec and a 5° C. temperature excursion to scan a 55 GHz bandwidth. As shown in FIG. 4A, for τ=100 μsec, an input signal level Pin=−51 dBm was detectable with a 4 GHz optical resolution; the average optical power incident on the receiver 109 photodiode was equal to −70 dBm (−51 dBm input signal minus the above-described—19 dBm insertion loss). This sensitivity is 30 dB better than what has previously been achieved with a DC-coupled photodiode/transimpedance amplifier circuit. As shown by FIGS. 4B–4D, increasing the time constant reduced the noise bandwidth, improving the sensitivity proportionately; −61 dBm sensitivity was observed for τ=1 msec and sensitivities below −80 dBm could be realized within practical integration periods. The submillisecond time constants, made possible through using a megahertz chopping rate, are commensurate with less than 1 second scan times required for large detector arrays (having N=256–512 detectors) in WDM optical monitors.

Improved detection sensitivity using the MARS chopper enables new methods of WDM channel monitoring, and optical power or optical signal-to-noise ratio measurement. For example, the improved signal to noise ratios enables accurate measurements of smaller optical signals meaning that couplers having smaller optical monitor tap ratios could be used to monitor optical signals within lightwave subsystems, such as optical amplifiers or adaptive equalizers. Additionally, because of the improvements resulting from lock-in detection, lower sensitivity (lower cost) detector(s) 506 could also be used in these lightwave subsystems.

Figure 5:
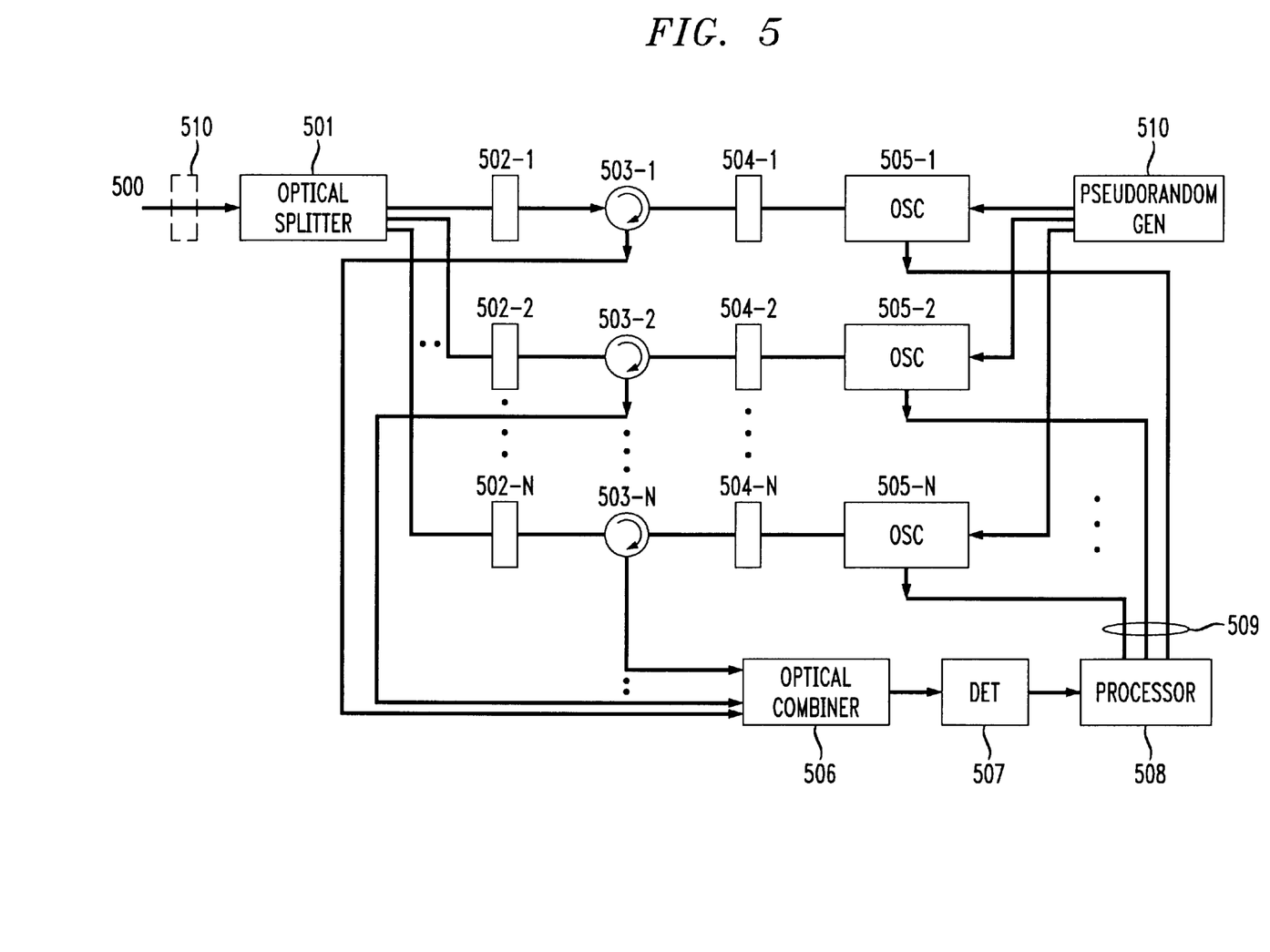
FIG. 5 shows a second illustrative embodiment of our optical signal monitor having a plurality of MARS choppers.

The MARS optical chopper 107 has wide application in optical monitors with either a single detector or detector arrays; configurations of multiple MARS choppers could be used in more complex monitors. One such example is shown in FIG. 5 where an optical signal monitor includes several MARS choppers 504-1 through 504-N. An optical signal splitter 501 divides the input signal 500 into N signals. Each of the signals pass through a respective one of the silicon-etalon filters 502-1 through 502-N and circulators 501-1 through 501-N to a respective one of the MARS choppers 504-1 through 504-N. The chop rate of each of the MARS choppers 504-1 through 504-N can be set at a different rate and each is set by a respective one of the oscillators 505-1 through 505-N. The resulting chopped signal is outputted from the circulators 503-1 through 503-N through an optical combiner 506 to a detector/receiver (or detector array) 507. The output from detector/receiver 507 is connected to processor 508. The processor 508 also receives the chopper rate signals 509 from oscillators 505-1 through 505-N. The processor 508 includes a lock-in amplifier unit in which the lock-in reference frequency-would be adjusted to each chopper rate signal 503, allowing all of the N input signals to be distinguished. The processor 508 also controls the frequency band selected by each of the silicon-etalon filters 502-1 through 502-N (not shown). In general, each of the MARS devices 504-1 through 504-N is capable of arbitrary waveform modulation (or chop) rates such as pseudorandom modulation, thereby allowing alternative means of correlation detection of the N signals. In such an arrangement, the rate of each of the oscillators 505-1 through 505-N is set by a pseudorandom generator 510. Thus, the arrangement of FIG. 5 enables much flexibilty since the modulation of each of the MARS devices 504-1 through 504-N and each of the silicon-etalon filters 502-1 through 502-N can be separately controled by the processor 508. If a wavelength scanning type operation, like FIG. 1, is desired the silicon-etalon filters 502-1 through 502-N can be replaced by a common silicon-etalon filter 510 operating under control of processor 508. Such an arrangement would enable the band being scanned by silicon-etalon filter 510 to be modulated at different rates using the MARS devices 504-1 through 504-N.

Figure 6:
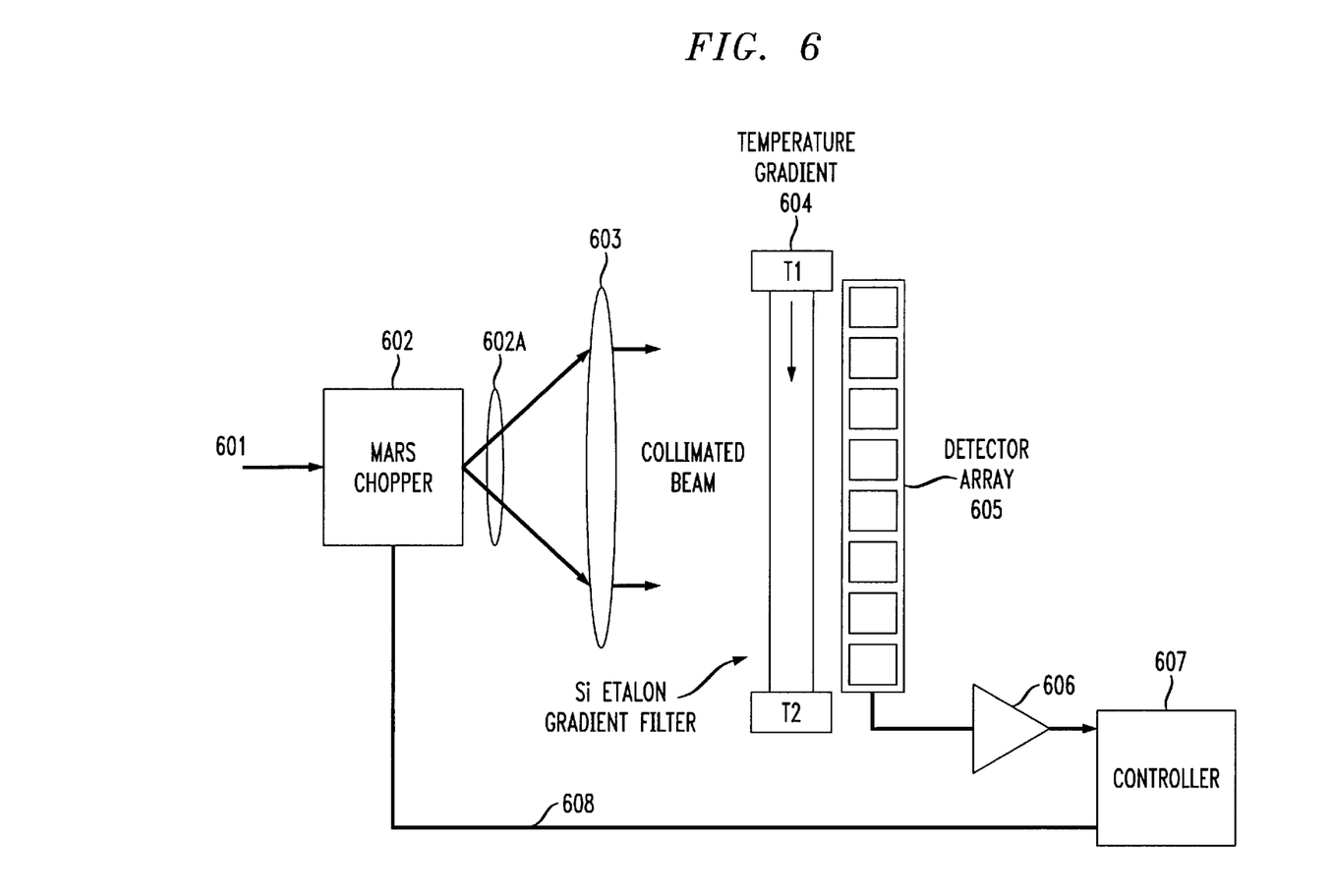
FIG. 6 shows another illustrative embodiment of a WDM optical monitor using a gradient etalon filter in front of a detector array.

One final WDM optical signal monitor example is shown in FIG. 6, which uses a gradient etalon filter 604 in front of a detector array 605. As shown, the input WDM signal 601 is chopped in MARS chopper unit 602, the chopped output beam 602A is collimated through a lens 603 and passes through the gradient etalon filter 604 to the detector array 605. It should be noted that the MARS chopper unit 602 may also be implemented using a MARS device and a GRIN (graded index) lens (not shown) to receive the input signal 601 and provide a chopped output over a separate optical path 602A. In this arrangement, the MARS chopper unit 602 may be implemented as shown in FIG. 1 (i.e., using a circulator 106 with the MARS chopper 107).

In FIG. 6, our idea is to transversely chirp the etalon filter 604 through a deliberate wedge or a temperature gradient, e.g., T1 at the top and T2 at the bottom of gradient etalon filter 604. Thus, the signal passband of etalon filter 604 varies from the bottom to the top. The result is that different parts of the collimated light beam pass through a different passband of etalon filter 604 and is received by a different element in detector array 605. The photocurrent of each detector is proportional to the optical power in the corresponding filter 604 passband. The dispersion of the input light through etalon filter 604, produces a significant optical signal throughput loss. This is because the optical signal power is shared equally among the N detectors, so each detector receives 1/N of the input optical signal. However, lock-in detection is used to recover the optical monitor sensitivity with a modest increase in the electronics cost and the use of a MARS chopper. The lock-in detection operates in the same manner as described for FIG. 1, that is, the output from the detector array 605 is amplified in amplifier 606 and synchronously detected in lock-in detector located in controller 607. The controller synchronously detects each of the N signals in phase with the reference oscillator signal 608 used to set the chop rate for the Mars chopper 602. The controller 607 processes these N detected signals and correlates each of the N detected signal amplitudes with each of the filter passbands of the gradient etalon filter 604.

Since the MARS modulator's chopping rate is much greater than that achievable with bulk mechanical choppers it is well suited for high-resolution, real-time optical monitoring. Results indicate that greater than 30 dB monitoring sensitivity improvement is possible, which could dramatically lower the detector cost, or promote new optical monitoring techniques for lightwave systems. It should also be noted that because the MARS modulator is a small device it is combined together with the etalon filter, MARS device(s), detector, processor, and other components and incorporated into a hybrid integrated circuit package. Moreover, since the both the MARS devices, etalon filter, detector, and processor are silicon based devices they may all be integrated together onto a common integrated circuit chip. Moreover, the small size would also enable such an optical monitor hybrid/integrated circuit to be incorporated into various lightwave subsystems at many locations throughout a WDM system.

As previously noted, many signal impairments can arise when some channels of a WDM system have too high or low a power level. In the case of long distance WDM systems in which optical signals generate nonlinear effects such as self-phase or cross-phase modulation, it is desirable to ensure that the power levels in each span of the WDM system remains well-equalized. Dynamic changes in the optical spectrum can also occur in a WDM system from effects such as WDM add/drop networks, spectral hole burning, transients caused by optical protection switching, gain tilt, etc. In general, all of these problems will get worse as more optical wavelengths are added to WDM systems. Amplifiers having selectable gain characteristics or separate equalizers are typically used to compensate and/or eliminate some or all of these problems. In accordance with another aspect of our invention, an optical monitor hybrid/integrated circuit could be incorporated with optical amplifiers or equalizers of a WDM system enabling them to be adaptive and respond in real time to predetermined changes in WDM signal conditions.

Figure 7:
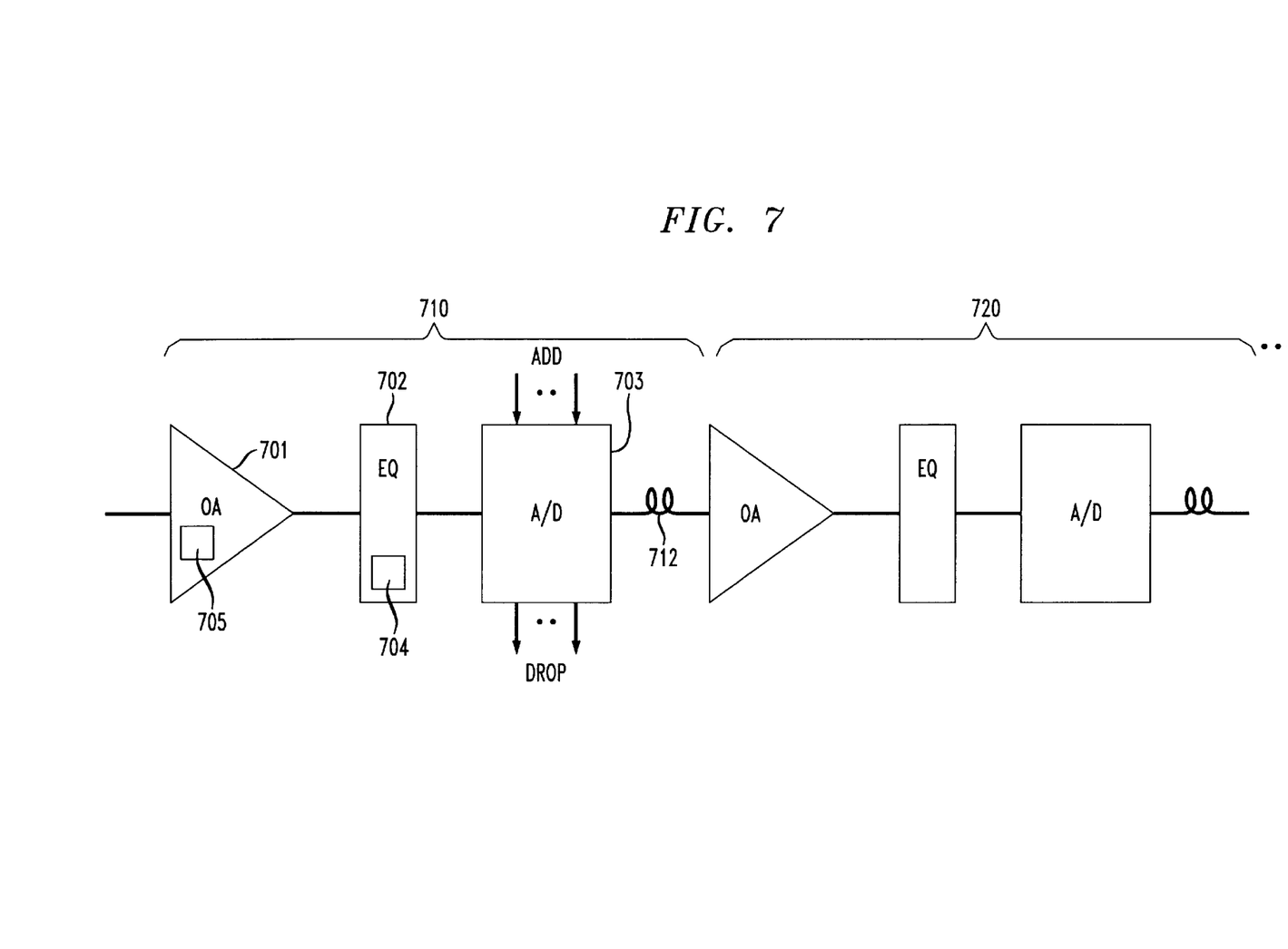
FIG. 7 illustrates a WDM system utilizing optical amplifiers and adaptive equalizers incorporating our optical monitor.

Shown in FIG. 7 is an illustrative WDM system in which this aspect of our invention may be utilized. The WDM system, illustratively, includes a plurality of optical spans or links 710, 720, etc., each span including an receiver/transmitter location e.g., 711 and an optical facility e.g., 712. A WDM signal is received and amplified in optical amplifier 701, equalized in equalizer 702, wavelengths added/dropped in add/drop unit 703, and the resulting WDM signal sent over the optical facility 712. In such an arrangement, the equalizer 702 may include our optical monitor hybrid/integrated circuit 704 to monitor the WDM signal. The output signals from optical monitor circuit 704 are used to change signal transmission characteristics of the equalizer 702 enabling the arrangement to be a real time adaptive equalizer. The processor of the adaptive equalizer could also include prestored algorithm(s) to determine, using the signals obtained the optical monitor circuit 704, which suitable characteristics of the equalizer should be changed. It should also be noted that in the same manner, the optical monitor hybrid/integrated circuit 704 could also be packaged together with each amplifier 701 and be used to control amplifier characteristics.

Thus, what has been described is merely illustrative of the application of the principles of the present invention. Other

APPENDIX

REFERENCES

[1] K. Goossen, J. Walker and S. Arney, "Silicon modulator based on mechanically-active anti-reflection layer with 1 Mbit/s capability for fiber in the loop applications," IEEE Photon. Tech. Lett. 6, pp.1119–1121, September 1994.

[2] J. E. Ford, J. A. Walker, and K. W. Goossen, "Fiber-coupled variable attenuator using a MARS modulator," in Microstructures and MEMS for Optical Process III, SPIE Proc. vol.3226, pp.86–9311997.

[3] C. R. Giles and L. Stulz, patent application, Ser. No. 08/919,743, filed on Aug. 28, 1997 and directed to a vernier spectrometer, a thermally tuned Si-Etalon filter, 1997.

What is claimed is:

1. An optical spectrum monitor comprising
   a temperature tuned silicon-etalon narrow band filter for scanning wavelength bands of an input multiwave optical signal selected in response to a temperature control signal;
   an optical signal modulator, having at least a microsecond operating rate, for modulating the input multiwave optical signal at a rate determined by a received high frequency electrical signal;
   a synchronous detector for detecting the modulated multiwave optical signal in synchronism with the high frequency electrical signal and for generating in response thereto the amplitude of the input multiwave optical signal; and
   a controller for generating the temperature control signal for selecting the wavelength band being scanned by the silicon-etalon filter and responsive to the amplitude of the input multiwave optical signal for determining the amplitude of the input multiwave optical signal as a function of the scanned wavelength band.

2. The optical signal monitor of claim 1 wherein the synchronous detector has a detection bandwidth greater than 100 KHz.

3. The optical signal monitor of claim 1 wherein the synchronous detector includes
   an optical signal detector for detecting the modulated multiwave optical signal to generate an amplitude modulated high frequency electrical signal and
   a lock-in amplifier for synchronously detecting the amplitude modulated high frequency electrical signal with the high frequency electrical signal.

4. The optical signal monitor of claim 2 wherein the lock-in amplifier has a filter time constant that is less than 100 $\mu$s.

5. The optical signal monitor of claim 1 wherein the optical signal modulator includes a circulator and a Mechanical AntiReflective Switch (MARS) signal chopper,
   said Mars chopper for modulating the input multiwave optical signal to form modulated multiwave optical signal, and
   said circulator for coupling the input multiwave optical signal to the MARS chopper and for coupling the modulated multiwave optical signal from the MARS chopper to the synchronous detector.

6. The optical signal monitor of claim 1 wherein the optical signal modulator includes a graded index (GRIN) device and a Mechanical AntiReflective Switch (MARS) signal chopper,
   said Mars chopper for modulating the input multiwave optical signal to form modulated multiwave optical signal, and
   said GRIN device for coupling the input multiwave optical signal to the MARS chopper over a first optical path and for coupling the modulated multiwave optical signal from the MARS chopper to the synchronous detector over a second optical path.

7. The optical signal monitor of claim 1 further comprising:
   an optical splitter for dividing the input multiwave optical signal into a plurality of optical signals;
   a plurality of temperature tuned silicon-etalon filters, each one for filtering one of the plurality of plurality of optical signals;
   a plurality of optical signal modulators, each one for modulating one of the plurality of optical signals at a rate determined by a received high frequency electrical signal; and
   an optical combiner for combining a plurality of modulated optical signals and coupling the combined optical signal to the synchronous detector for detection.

8. The optical signal monitor of claim 7 wherein each of the plurality of optical signal modulators is controlled by a received high frequency electrical signal at a different frequency.

9. The optical signal monitor of claim 8 wherein each of the received high frequency electrical signal is at a different frequency selected by a pseudorandom generator.

10. An optical spectrum monitor comprising:
    an optical signal modulator, having at least a microsecond operating rate, for modulating an input multiwave optical signal at a rate determined by a received high frequency electrical signal and for outputting the modulated multiwave optical signal;
    a lens for collimating the modulated multiwave optical signal;
    a transversely chirped etalon filter for receiving the collimated modulated multiwave optical signal;
    a detector array, each detector receiving and detecting a narrow wavelength band signal portion of the collimated modulated multiwave optical signal to form therefrom an electrical signal; and
    a controller for generating the high frequency electrical signal, for synchronously detecting each of the electrical signals, and for generating for each narrow wavelength band, data representing the amplitude of each narrow wavelength band signal portion of the input multiwave optical signal.

11. A wavelength division multiplexed (WDM) system including a plurality of spans, at least one span comprising:
    an optical amplifier unit for receiving and amplifying a WDM signal;
    an equalizer unit for equalizing the amplified WDM signal; wherein
    at least one of the optical amplifier and the equalizer units includes means for changing its optical transmission characteristics as a function of wavelength in response to a received control signal; and
    an optical monitor for generating said control signal, said optical monitor including
    a temperature tuned silicon-etalon narrow band filter for scanning wavelength bands of an input WDM signal selected in response to a temperature control signal;

an optical signal modulator, having at least a microsecond operating rate, for modulating the input WDM signal at a rate determined by a received high frequency electrical signal;

a synchronous detector for detecting the modulated WDM signal in synchronism with the high frequency electrical signal and for generating in response thereto the amplitude of the input WDM signal; and a controller for generating the temperature control signal for selecting the wavelength band being scanned by the silicon-etalon filter and responsive to the amplitude of the input WDM signal for generating said control signal indicating the amplitude of the input WDM signal as a function of the scanned wavelength band.

12. A wavelength division multiplexed (WDM) system including a plurality of spans, at least one span comprising:

an optical amplifier unit for receiving and amplifying a WDM signal;

an equalizer unit for equalizing the amplified WDM signal; wherein at least one of the optical amplifier and the equalizer units includes means for changing its optical transmission characteristics as a function of wavelength in response to a received control signal; and an optical monitor for generating said control signal, said optical monitor including an optical signal modulator, having at least a microsecond operating rate, for modulating an input WDM signal at a rate determined by a received high frequency electrical signal and for outputting a modulated WDM signal;

a lens for collimating the modulated WDM signal;

a transversally chirped etalon filter for receiving the collimated modulated WDM signal;

a detector array, each detector receiving and detecting a narrow wavelength band signal of the collimated modulated WDM signal to form therefrom an electrical signal; and a controller for generating the high frequency electrical signal, for synchronously detecting each of the electrical signals, and for generating said control signal indicating for each narrow wavelength band, data representing the amplitude of each narrow wavelength band signal of the input WDM signal.

13. A method of operating an optical spectrum monitor comprising the steps of:

scanning selected narrow wavelength bands of an input WDM signal in response to a control signal;

modulating the input WDM signal at at least a microsecond operating rate;

synchronously detecting the modulated WDM signal in synchronism with the high frequency electrical signal and for generating in response thereto an amplitude of the input WDM signal; and generating the control signal for selecting the wavelength band being scanned and determining using the amplitude of the input WDM signal the change in the amplitude of the input WDM signal as a function of the scanned wavelength band.

14. A method of operating an optical spectrum monitor comprising the steps of:

modulating an input WDM signal at at least a microsecond operating rate selected in response to a received high frequency electrical signal and outputting a modulated WDM signal;

collimating the modulated WDM signal;

passing the collimated WDM optical signal through a transversally chirped narrow band filter to generate a narrow wavelength band signal;

detecting the narrow wavelength band signal and forming therefrom an electrical signal;

generating the high frequency electrical signal; and synchronously detecting each of the electrical signals and generating for each narrow wavelength band, data representing the amplitude of each narrow wavelength band signal of the input WDM signal.

* * * * *